United States Patent
Nightingale

(10) Patent No.: US 6,631,155 B1
(45) Date of Patent: Oct. 7, 2003

(54) MULTI-OUTPUT LASER-RADIATION SOURCE

(75) Inventor: John L. Nightingale, Portola Valley, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 10/287,146

(22) Filed: Nov. 4, 2002

(51) Int. Cl.[7] ................................................ H01S 3/08

(52) U.S. Cl. ........................ 372/107; 372/98; 372/97; 372/101

(58) Field of Search .................... 372/98, 101–108, 372/97

(56) References Cited

U.S. PATENT DOCUMENTS 5,661,737 A * 8/1997 Hecht et al. .................. 372/23
2002/0105984 A1 * 8/2002 Yamamoto et al. .......... 372/44

* cited by examiner

*Primary Examiner*—Leon Scott, Jr.
(74) *Attorney, Agent, or Firm*—Stallman & Pollock LLP

(57) ABSTRACT

A laser-radiation source includes a laser delivering an output beam, a lens, and an optical arrangement for dividing the output beam into a main beam and an auxiliary beam. The main and auxiliary beams are coupled by the lens into entrance faces of respectively a main optical fiber and an auxiliary optical fiber. The entrance face of the main optical fiber is located on the optical axis of the lens. The entrance face of the auxiliary optical fiber is laterally displaced from the optical axis of the lens.

25 Claims, 2 Drawing Sheets

MULTI-OUTPUT LASER-RADIATION SOURCE

TECHNICAL FIELD OF THE INVENTION

The present invention relates generally to apparatus for sampling the output of a laser source delivering laser-radiation via an optical fiber. The invention relates in particular to a laser source including a lens directing primary output into a first optical fiber and sampled output into a second optical fiber.

DISCUSSION OF BACKGROUND ART

In many commercially available laser-radiation sources including a semiconductor laser, an array of semiconductor lasers, or a miniaturized diode-pumped solid-state laser for generating laser-radiation, the lasers or arrays are often packaged in a robust housing from which the laser-radiation is delivered via an optical fiber. This optical fiber is often referred to as a "pigtail" by practitioners of the art. The housing includes a lens for focusing (coupling) the laser-radiation into the optical fiber and may include other optical or electrical components depending on the type of laser or array.

Semiconductor lasers used in such a light source include edge-emitting diode-lasers and arrays thereof, electrically-pumped, vertical-cavity, surface-emitting lasers (VCSELs), and optically-pumped semiconductor (OPS) lasers using surface emitting semiconductor gain structures. Components included in the housing in addition to the focusing lens may include beam-shaping optics or, in the case of OPS or miniaturized solid-state lasers, diode-lasers for optical pumping. The housing is typically hermetically sealed and the optical fiber delivering the laser-radiation exits the housing via a sealed feedthrough.

In applications using such a laser-radiation source, it is often necessary to sample the delivered radiation. This may be required, for example, to monitor power of the radiation or to monitor the wavelength of the laser-radiation for tuning or wavelength-locking the source.

One commonly used method of sampling radiation from the delivery optical fiber of such a light source is to provide a tap on the optical fiber. This is typically done using a fused optical-fiber coupler. Such a coupler is relatively expensive, particularly if the polarization integrity of the laser-radiation must be preserved. Depending on the type of laser-radiation source, the cost of providing such a polarization-preserving tap may be as much as fifty percent of the source itself.

In some packages monitoring devices are included within the package. Sampling of the beam is effected by mirrors or the like within the package. Space restrictions within a package and environmental control issues, however, can limit the effectiveness of such devices.

There is a need for an inexpensive method of sampling the output of an optical fiber delivered light source. The method preferably should allow the sampled output to be used by devices located outside a package in which the source is housed.

SUMMARY OF THE INVENTION

The present invention is directed to a laser-radiation source delivering a main laser-radiation beam via one optical fiber and an auxiliary laser-radiation beam, of lesser power than the main laser-radiation beam, via another optical fiber. In one aspect, the inventive laser source comprises a laser delivering an output beam of laser-radiation, a lens, and two optical fibers. An optical arrangement is provided for dividing the output laser-radiation beam into the main laser-radiation beam and the auxiliary laser-radiation beam. The lens couples the main laser-radiation beam into an entrance face of one of the optical fibers, and couples the auxiliary laser-radiation beam into an entrance face of the other of the optical fibers.

The beam-dividing arrangement is located between the laser and the lens. Preferably, the optical fiber into which the main beam is coupled (the main optical fiber) is located with the entrance face thereof on an optical axis of the lens and spaced apart from the lens on a side thereof opposite the beam-dividing arrangement. The optical fiber into which the auxiliary beam is coupled (the auxiliary optical fiber) is preferably located adjacent the main optical fiber with the entrance face of the auxiliary optical fiber laterally spaced apart from the optical axis, and spaced apart from the lens by about the same distance as the entrance face of the main optical fiber. The optical fibers are preferably spaced apart from the lens by about one focal length thereof.

In one embodiment of the inventive laser source, the optical dividing arrangement is a wedge of a transparent material having entrance and exit surfaces located in the path of the output laser-radiation beam. The output laser-radiation beam is transmitted through the entrance surface of the wedge such that it is incident on the exit surface thereof. A portion of the entrance-surface-transmitted laser-radiation beam is transmitted through the exit surface of the wedge to provide the main laser-radiation beam. Another portion of the first-surface transmitted laser-radiation beam is reflected from the exit surface of the wedge and a portion of the exit-surface-reflected portion is reflected from the entrance surface of the wedge and transmitted through the exit surface of the wedge to provide the auxiliary laser-radiation beam. The main laser-radiation beam, on exiting the wedge, propagates generally along the optical axis of the lens, and the auxiliary laser-radiation beam, on exiting the wedge, propagates at an angle to the optical axis of said lens.

In another embodiment of the inventive laser source, the optical dividing arrangement includes a plate of a transparent material and a mirror. The plate has an entrance surface and an exit surface and is located on the optical axis of the lens and inclined thereto. The plate and the mirror are arranged such that a first portion of the output laser-radiation beam is transmitted through the plate to provide the main laser-radiation beam. A second portion of the output laser-radiation beam is reflected from the plate onto the mirror and reflected the mirror through the plate to provide the auxiliary laser-radiation beam. The main laser-radiation beam, on exiting the plate, propagates generally along the optical axis of the lens. The auxiliary laser-radiation beam, on exiting the plate, propagates at an angle to the optical axis of the lens.

In another aspect of the present invention, the laser, the lens, and the optical dividing arrangement are located in an enclosure. The entrance ends of the main and auxiliary optical fibers are located within the enclosure. The optical fibers extend through a wall of the enclosure for delivering the main and auxiliary laser-radiation beams from the enclosure.

An advantage of the inventive laser-radiation source compared with prior art fiber-delivered laser-radiation sources is that a sample of the laser-radiation is provided by an auxiliary optical fiber separate from the main (delivery) optical fiber, thereby avoiding a need to tap a delivery fiber to obtain a sample of the laser-radiation. A lens that would be required in any case to couple the laser radiation into the main optical fiber also couples a sample of the radiation into the auxiliary optical fiber. This minimizes the cost of providing the laser-radiation sample. Those skilled in the art will recognize other embodiments and advantages of the present invention from the detailed description of the invention presented hereinbelow.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 1:
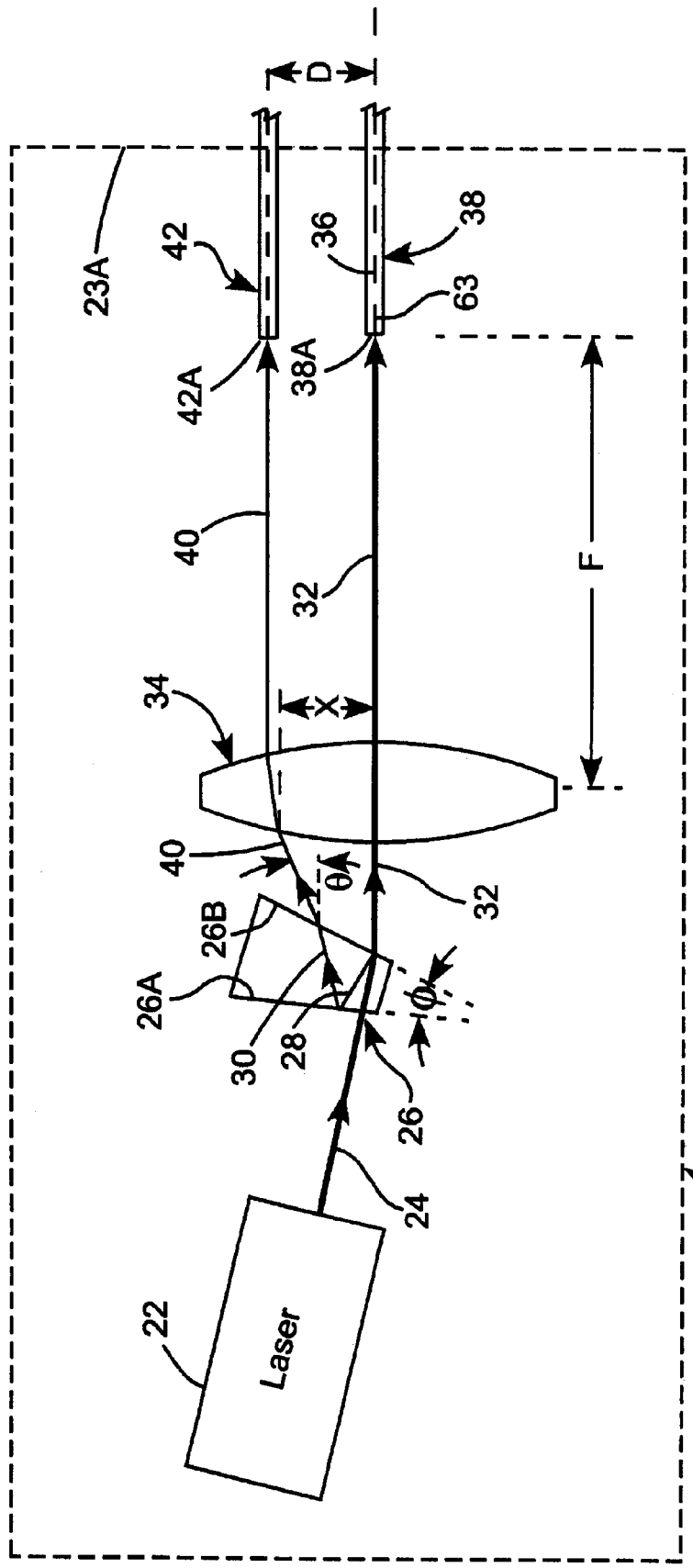
FIG. 1 schematically illustrates one embodiment of optical apparatus in accordance with the present invention including a laser delivering an output beam, an optical wedge for, dividing the laser output beam into a main beam and an auxiliary beam, and a lens directing the main and auxiliary beams into respectively main and auxiliary optical fibers.

Referring now to the drawings, wherein like features are designated by like reference numerals, FIG. 1 schematically illustrates a preferred embodiment 20 of laser apparatus in accordance with the present invention. Apparatus 20 includes a laser 22 delivering an output beam 24 of laser-radiation. Output beam 24 is directed to an optical wedge 26 of a transparent optical material. Optical wedge 26 has surfaces 26A and 26B thereof inclined at an angle ($\phi$ to each other. Angle ($\phi$ is generally termed the apex-angle of the wedge by practitioners of the art.

Output beam 24 is preferably approximately collimated. By way of example, a beam delivered from a solid-state laser resonator will usually be found to be sufficiently collimated. If laser 22 is a diode-laser, then beam shaping and collimating optics will be required to collimate the laser output and provide beam 24. As such beam shaping optics are well known in the art, a detailed description thereof is not included herein.

Laser-radiation beam 24 enters optical wedge 26 via entrance surface 26A thereof and exits the optical wedge via exit surface 26B thereof. The angle of incidence of the laser radiation on at least one of the surfaces is non-normal. Surfaces 26A and 26B of optical wedge 26 are preferably uncoated. The surfaces, accordingly, have a reflectivity for the laser-radiation dependent on the refractive index of the optical wedge material, the angle of incidence of the laser-radiation on the surfaces, and the polarization state of the laser-radiation. For common optical materials the reflectivity per surface may be between about four and five percent.

A portion 28 of laser-radiation beam 24 is reflected from surface 26B of the optical wedge, and a portion 30 of portion 28 of the laser-radiation beam is reflected from surface 26A of the optical wedge. Laser-radiation beam 24 is refracted by optical wedge 26 once at each face thereof and exits the optical wedge as a beam 32, hereinafter designated the main beam. Optical power in main beam 32 is between about 8 and 10 percent less than the power in output beam 24 as a result of reflections at the entrance and exit surfaces of optical wedge 26.

Apparatus 20 includes a lens 34 having an optical axis 36. Lens 34 is arranged to couple radiation from main beam 32 into an optical fiber 38 having an entrance face 38A thereof preferably centered on optical axis 36 of the lens. Entrance face 38A of the optical fiber is preferably spaced apart from lens 34 by about one focal length (F) thereof. On exiting optical wedge 26, main beam 32 propagates along optical axis 36 of lens 34 and is focused by the lens into entrance face 38A of optical fiber 38.

Twice reflected portion 30 of laser-radiation beam 24 exits optical wedge 26 as a laser-radiation beam 40, hereinafter referred to as the auxiliary beam. The path of auxiliary beam 40, on exiting the optical wedge, is inclined at an angle θ to main beam 32, and correspondingly to optical axis 36 of lens 34. Lens 34 couples auxiliary beam 40 into an optical fiber 42 via entrance face 42A thereof. Optical fiber 42 is referred to hereinafter as the auxiliary optical fiber. Laser 22, optical wedge 26, lens 34, and entrance faces 38A and 42A of the optical fibers are preferably packaged within an enclosure indicated by dashed line 23. In this case, the optical fibers would extend through wall 23A of the enclosure for delivering main and auxiliary laser-radiation power out of the enclosure. Various arrangements for passing optical fibers through walls of sealed enclosures are well known in the art, and, accordingly, are not discussed in detail herein.

Entrance face 42A of the auxiliary optical fiber is laterally spaced apart (displaced) by a distance D from optical axis 63. Preferably, but not necessarily, entrance face 42 a of the auxiliary optical fiber is also spaced apart from lens 34 by about one focal length thereof. Those skilled in the art will recognize that, if surfaces 26A and 26B are uncoated, the optical power in auxiliary beam 40 will be only about 0.2% of the optical power in main beam 32. This, however, will be found adequate for monitoring operations in many applications of apparatus 20. For optimum coupling of the main and auxiliary beams into the corresponding optical fibers, the separation of the main and auxiliary beams at the focus of lens 34 should be about equal to the distance D between the entrance faces of the optical fibers. Accordingly, distance D at the lens focus can be defined by an equation:

$$D = X + F(\theta - X/F) \tag{1}$$

where X is the displacement of auxiliary beam 40 at lens 34. By selecting the thickness and apex angle of optical wedge 26, the axial spacing between the optical wedge and the lens, and the orientation of the wedge with respect to the beam, it is possible to independently select values for displacement X and inclination angle θ.

Preferably entrance face 38A of main optical fiber 38 is arranged perpendicular to optical axis 36 to optimize coupling of radiation into the optical fiber. If entrance face 42A of auxiliary fiber 42 is also arranged perpendicular to optical axis 36, then angle and distance X are preferably arranged (cooperative with focal length F) such that auxiliary beam 40 is parallel to main beam 32. In this case, a reverse projection of beam 40 would intersect the axis of the 34 one focal length away from the lens.

Apparatus 20 is particularly suitable for monitoring operations of a laser 22 used as a transmitter in an optical telecommunications system. In such a system, main optical fiber 38 would typically be a single-mode optical fiber having and outside diameter of about 125 micrometers ($\mu$m) and a core diameter of about 9 $\mu$m. Preferably, distance D by which entrance face 42A of auxiliary fiber 42 is displaced from entrance face 38A of main fiber 38 is kept as small as possible. By way of example, if auxiliary optical fiber 42 also had an outer diameter of 125 $\mu$m, distance D would have a minimum value of 125 $\mu$m. If lens 34 has a focal length of about 750 $\mu$m, and optical wedge 26 has a refractive index of 1.45, a thickness at the point of entry of beam 24 of 470 $\mu$m, and is spaced 100 $\mu$m from lens 34, an apex angle of 3.3 degrees for optical wedge 26 can provide X equal to D equal to 125 $\mu$m with auxiliary beam 40 parallel to main beam 32. It should be noted, here, that the present invention is not limited to coupling into single-mode fibers. Other types of optical fiber to which the present invention is applicable include but are not limited to polarization-preserving optical fibers, and multimode optical fibers.

Figure 2:
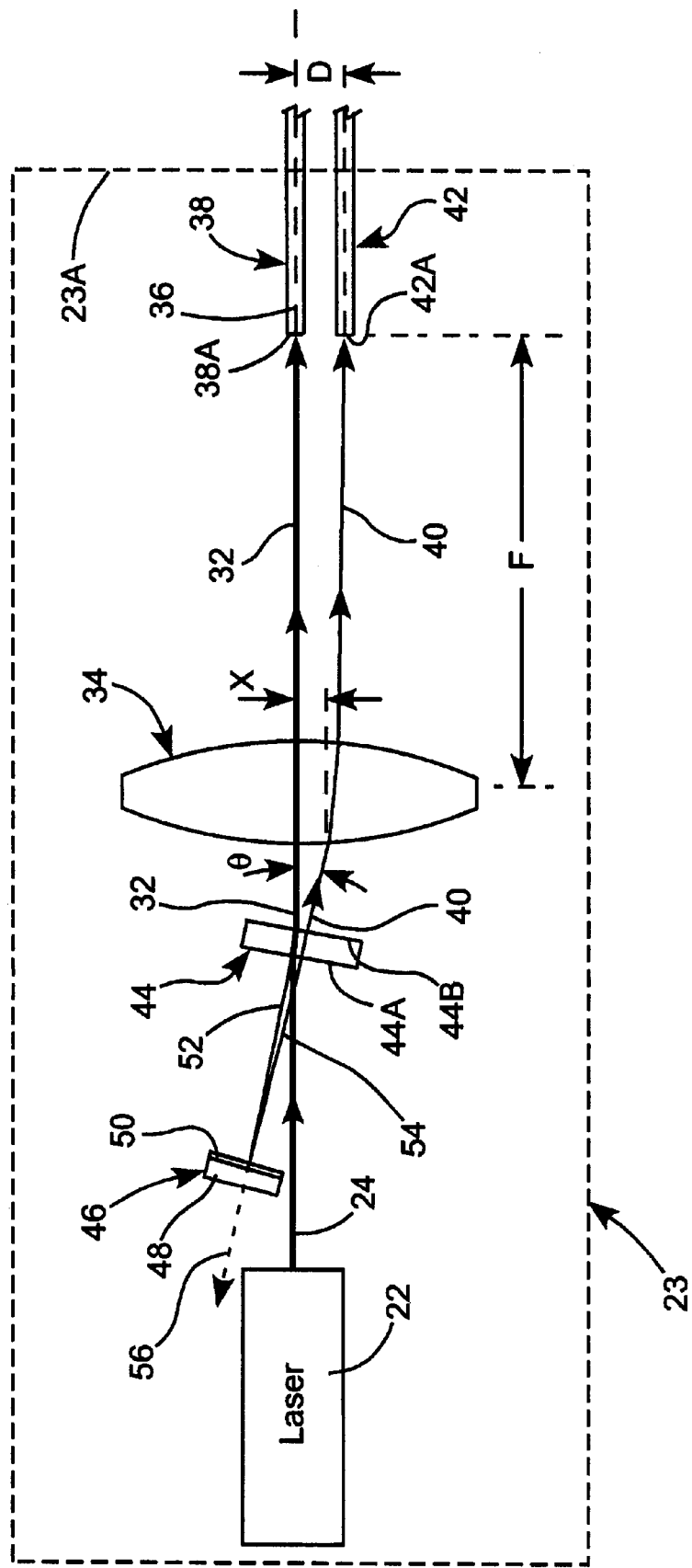
FIG. 2 schematically illustrates another embodiment of optical apparatus in accordance with the present invention similar to the apparatus of FIG. 1 but wherein an optical arrangement including a transparent, parallel-sided plate and a mirror is used, in place of the optical wedge, to divide the output beam into the main beam and the auxiliary beam.

FIG. 2 schematically illustrates another embodiment 21 of a laser apparatus in accordance with the present invention. Apparatus 21 is similar to apparatus 20 of FIG. 1 with an exception that optical wedge 26 is replaced by a transparent plate 44 and a mirror 46, for dividing the laser output beam into a main beam and an auxiliary beam.

Transparent plate 44 is located on optical axis 36 of lens 34 and has opposite surfaces 44A and 44B. Laser 22 is arranged such that output beam 24 thereof is directed parallel to optical axis 36 onto plate 44. Surfaces 44A and 44B of plate 44 are preferably parallel to each other, however, that is not a requirement of the present invention. Surface 44A is preferably uncoated and surface 44B is preferable antireflection coated. Plate 44 is inclined at an angle to optical axis 36. A portion 52 of output-beam 24, for example, between about 4% and 5% is reflected from uncoated surface 44A onto mirror 40.

Mirror 48 includes a reflective coating 50 which may be a fully reflective coating, or a partially transmissive and partially reflective coating. The reflectivity of coating 50 determines the portion 54 of reflected portion 52 that is reflected from the mirror. Portion 54 is directed through plate 44 as auxiliary beam 40. The auxiliary beam is coupled by lens 34 into entrance face 42 of auxiliary optical fiber 42. Any portion 56 of reflected portion 52 that is transmitted through coating 50 can be used for additional monitoring purposes.

An advantage of the plate-and-mirror beam-dividing arrangement of apparatus 21, compared with optical wedge 26 of apparatus 20, is that a greater fraction of main beam 24 may be sampled for less power reduction of the main beam. By way of example, if both surfaces of optical wedge 26 in apparatus 20 are uncoated the power in auxiliary beam 40 will be about 0.20%, and the corresponding loss of power in the maim beam will be about 9%. If surface 44A of plate 44 in apparatus 21 is uncoated, surface 44B is antireflection coated, and coating 50 of mirror 46 is a high efficiency dielectric coating having a reflectivity of about 99.9%, a 4.5% sample beam can be obtained with a loss of power of only about 4.5% in the main beam.

Having a higher power in the sample beam relieves the coupling efficiency requirements for coupling radiation into auxiliary optical fiber 42. Coupling efficiency may be as low as 1% while still having sufficient power delivered by the auxiliary optical fiber for monitoring purposes. Because of this, spacing of entrance face 42A of auxiliary fiber 42 from lens 34 is not critical. Coupling efficiency for main beam 32 into main optical fiber 38 is preferably about 80% or better.

The present invention is described above with reference to a preferred and other embodiments. The invention is not restricted, however, to the embodiments described and depicted. Rather, the invention is limited only by the claims appended hereto.

What is claimed is:

1. Optical apparatus, comprising:
   a laser delivering a first laser-radiation beam;
   a lens having an optical axis;
   first and second optical fibers, each thereof having an entrance face, with the entrance face of the first optical fiber being substantially aligned with the optical axis of the lens and the entrance face of the second optical fiber being spaced therefrom; and
   an optical arrangement for dividing said first laser-radiation beam into second and third laser-radiation beams, said second laser radiation beam being directed into the lens substantially along the optical axis thereof and the third laser radiation beam being directed into the lens at an angle with respect to the optical axis thereof, said laser second and third laser-radiation beams being coupled by said lens into respectively said first and second optical fibers via said entrance faces thereof.

2. The apparatus of claim 1, wherein said beam-dividing arrangement is located between said laser and said lens.

3. The apparatus of claim 2, wherein the entrance face of the first optical fiber is spaced apart from said lens on a side thereof opposite said beam-dividing arrangement.

4. The apparatus of claim 3, wherein the entrance face of said second optical fiber is spaced apart from said lens by about the same distance as said entrance face of said first optical fiber.

5. The apparatus of claim 4, wherein said entrance faces of said optical fibers are spaced apart from said lens by about one focal-length of said lens.

6. The apparatus of claim 1, wherein said optical beam-dividing arrangement is a wedge of a transparent material having first and second surfaces located in the path of said first laser-radiation beam, said first and second surfaces being numbered in the direction of propagation of said laser-radiation beam.

7. The apparatus of claim 6, wherein said first laser-radiation beam is transmitted through said first surface of said wedge such that it is incident on said second surface thereof, a first portion of said transmitted first laser-radiation-beam being transmitted through said second surface of said wedge to provide said second laser-radiation beam, and wherein a second portion of said first laser-radiation beam is reflected from said second surface of said wedge, and a portion of said first-surface-reflected portion is reflected from said first surface of said wedge and transmitted through said second surface of said wedge to provide said third laser-radiation beam.

8. The apparatus of claim 7, wherein said second laser-radiation beam, on exiting said wedge, propagates generally along said optical axis of said lens, and said third laser-radiation beam propagates at an angle to said optical axis of said lens.

9. The apparatus of claim 8, wherein said second and third laser beams are parallel to each other on exiting said lens.

10. The apparatus of claim 1, wherein said optical beam-dividing arrangement includes a plate of a transparent material and a mirror, said plate being located on said optical axis of said lens and inclined thereto, said plate and said mirror being arranged such that a portion of said first laser-radiation beam is transmitted through said plate to provide said second laser-radiation beam, and a second portion of said first laser-radiation beam is reflected from a surface of said plate onto said mirror and reflected from said mirror through said plate to provide said third laser-radiation beam.

11. The apparatus of claim 10, wherein said second laser-radiation beam, on exiting said plate, propagates generally along said optical axis of said lens, and said third laser beam, on exiting said plate, propagates at an angle to said optic axis of said lens.

12. Optical apparatus, comprising:

a laser delivering a first laser-radiation beam;

first and second optical fibers, each thereof having an entrance face;

an optical wedge of a transparent material having first and second surfaces located in the path of said first laser-radiation beam, said optical wedge being arranged to divide said first laser-radiation beam into second and third laser-radiation beams; and a lens having an optical axis, said lens arranged to couple said second and third laser-radiation beams into respectively said first and second optical fibers via said entrance faces thereof with the entrance face of the first optical fiber being substantially aligned with the optical axis of the lens and the entrance face of the second optical fiber being spaced therefrom and wherein said second laser radiation beam is directed by said wedge into the lens substantially along the optical axis thereof and wherein the third laser radiation beam is directed by said wedge into the lens at an angle with respect to the optical axis thereof.

13. The apparatus of claim 12, wherein said optical wedge is located between said laser and said lens.

14. The apparatus of claim 13, wherein the entrance face of the first optical fiber is spaced apart from said lens on a side thereof opposite said optical wedge.

15. The apparatus of claim 14, wherein the entrance face said second optical fiber is spaced apart from said lens by about the same distance as said entrance face of said first optical fiber.

16. The apparatus of claim 15, wherein said entrance faces of said optical fibers are spaced apart from said lens by about one focal length of said lens.

17. Optical apparatus, comprising:

a laser delivering a laser-radiation beam;

a lens having an optical axis;

first and second optical fibers each thereof having an entrance face;

a transparent plate located on said optical axis of said lens and inclined thereto, said plate transmitting a first portion of said laser-radiation beam along the optical axis of the lens, and wherein a second portion of said laser-radiation beam is reflected from a surface of said plate a mirror positioned to reflect said second portion back through the plate so that the second portion enters the lens at an angle with respect to the optical axis thereof; and said lens being arranged to couple said first and second beam portions into respectively said first and second optical fibers via said entrance faces thereof with the entrance face of the first optical fiber being substantially aligned with the optical axis of the lens and the entrance face of the second optical fiber being spaced therefrom.

18. The apparatus of claim 17, wherein the entrance face of the first optical fiber spaced apart from said lens on a side thereof opposite said transparent plate.

19. The apparatus of claim 18, wherein the entrance face of said second optical fiber is spaced apart from said lens by about the same distance as said entrance face of said first optical fiber.

20. The apparatus of claim 19, wherein said entrance faces of said optical fibers are spaced apart from said lens by about one focal length of said lens.

21. In a laser delivery system, wherein the output beam from a laser is focused into a main delivery fiber by a lens and wherein the entrance face of the delivery fiber is substantially aligned with the optical axis of the lens, an arrangement for monitoring the power of the beam coupled into the main delivery fiber comprising:

a secondary delivery fiber having an entrance face near the entrance face of the main delivery fiber; and an optical beam divider located between the laser and the focusing lens, said beam divider for splitting the beam into a primary beam portion and a secondary beam portion, with the energy of the primary beam portion being at least about an order of magnitude greater than the secondary beam portion, said beam divider being configured so that the primary beam portion is directed into the lens along the optical axis thereof and focused by the lens into the entrance face of the main delivery fiber and wherein the secondary beam portion is directed into the lens at an angle with respect to and spaced from the primary beam portion such that the secondary beam portion is focused into the entrance face of the secondary delivery fiber, wherein the laser energy carried by the secondary delivery fiber can be monitored to provide information about the energy carried by the main delivery fiber.

22. A delivery system as recited in claim 21, wherein said beam divider is defined by a wedge of transparent material.

23. A delivery system as recited in claim 21, wherein said beam divider is defined by a combination of a transparent plate and mirror, wherein the transparent plate is inclined at an angle with respect to the propagation axis of the beam.

24. The delivery system of claim 21, wherein said entrance faces of said optical fibers are spaced apart from said lens by about one focal-length of said lens.

25. The delivery system of claim 21, wherein the propagation axes of said primary and secondary beam portions are parallel to each other on exiting said lens.

* * * * *